United States Patent [19]

Tsunoda et al.

[11] Patent Number: 4,975,749
[45] Date of Patent: Dec. 4, 1990

[54] AUTOMATIC DOCUMENT FEEDER

[75] Inventors: Kouichi Tsunoda, Yokohama; Kouichi Noguchi, Machida; Tadao Koike, Tokyo; Hiroshi Takahashi, Kawasaki, all of Japan

[73] Assignee: Ricoh Company, Ltd., Tokyo, Japan

[21] Appl. No.: 365,550

[22] Filed: Jun. 13, 1989

[30] Foreign Application Priority Data

Jun. 17, 1988 [JP] Japan ................................ 63-148184
Jun. 17, 1988 [JP] Japan ................................ 63-148185

[51] Int. Cl.⁵ ............................................ G03G 21/00
[52] U.S. Cl. ..................................... 355/320; 271/186; 271/291; 271/902; 355/308; 355/318; 355/319; 355/321
[58] Field of Search ............... 355/308, 309, 311, 318, 355/319–322, 23, 24; 271/902, 186, 291

[56] References Cited

U.S. PATENT DOCUMENTS

| | | | |
|---|---|---|---|
| 4,231,561 | 11/1980 | Kaneko et al. | 355/23 X |
| 4,264,067 | 4/1981 | Adams et al. | 271/902 X |
| 4,272,180 | 6/1981 | Satomi et al. | 355/319 X |
| 4,544,148 | 10/1985 | Kitajima et al. | 271/902 X |
| 4,639,125 | 1/1987 | Okuda et al. | 271/186 X |
| 4,650,313 | 3/1987 | Koike | 355/319 |
| 4,667,951 | 5/1987 | Honjo et al. | 271/902 X |
| 4,744,553 | 5/1988 | Hirose | 355/23 X |
| 4,761,001 | 8/1988 | Hayakawa et al. | 271/902 X |
| 4,817,933 | 4/1989 | Honjo et al. | 271/902 X |
| 4,831,411 | 5/1989 | Sugishima | 355/319 |
| 4,851,883 | 7/1989 | Ito | 355/203 X |

FOREIGN PATENT DOCUMENTS

| | | | |
|---|---|---|---|
| 0132251 | 8/1983 | Japan | 355/23 |
| 58-167351 | 10/1983 | Japan . | |
| 59-197059 | 11/1984 | Japan . | |
| 59-218464 | 12/1984 | Japan . | |
| 61-80144 | 4/1986 | Japan . | |
| 61-90944 | 5/1986 | Japan . | |
| 61-90947 | 5/1986 | Japan . | |
| 0021666 | 1/1987 | Japan | 271/186 |
| 62-56231 | 3/1987 | Japan . | |
| 0081654 | 4/1987 | Japan | 355/319 |
| 62-180837 | 8/1987 | Japan . | |
| 63-41328 | 2/1988 | Japan . | |
| 0041336 | 2/1988 | Japan | 271/186 |
| 63-180630 | 7/1988 | Japan . | |
| 0196426 | 8/1988 | Japan | 271/186 |
| 0196427 | 8/1988 | Japan | 271/186 |
| 63-235226 | 9/1988 | Japan . | |

Primary Examiner—A. T. Grimley
Assistant Examiner—Matthew S. Smith
Attorney, Agent, or Firm—Oblon, Spivak, McClelland, Maier & Neustadt

[57] ABSTRACT

An automatic document feeder (ADF) used with an image processing apparatus, such as copier, has an original table for stacking thereon a plurality of originals to be scanned. A first and second receiving trays are each provided for receiving therein the originals. A first conveying mechanism is provided for conveying the originals from the feeding tray to an original supporting station of the ADF in order from the uppermost original and is able to reverse each of the originals upside down while conveying the same. A second conveying mechanism is provided for conveying a single-sided original from the station to the first receiving tray, without reversing the original upside down, after the scanning of one side of the original has been completed. A third conveying mechanism is provided for removing a double-sided original from the station and then returning the original to the station, while reversing the original upside down, after the scanning of one side of the original has been completed. A fourth conveying mechanism is further provided for conveying the double-sided original from the station to the second receiving tray, while reversing the original upside down, after the scanning of the other side of the original has been completed.

10 Claims, 11 Drawing Sheets

AUTOMATIC DOCUMENT FEEDER

BACKGROUND OF THE INVENTION

The present invention relates to an automatic document feeder for use in combination with an image processing apparatus such as copying apparatus, facsimile telegraph or the like. The apparatus has an original supporting station for supporting thereon an original and which is selectively operative in a first scanning mode for scanning one side of the original or in a second scanning mode for scanning opposite sides of the original.

Generally, a known automatic document feeder (ADF) used with, e.g., a copying apparatus comprises an original table for stacking thereon a plurality of originals to be copied. The originals, each having a front and back sides, are stacked on the original table in the state that each of the front sides of the originals faces upward.

In case of a plurality of single-sided image bearing originals having successive pages, the arrangement of the originals on the original table is such that the front side of the uppermost original has the first page, and the front side of the original adjacent to the uppermost original has the second page, while the front side of the lowermost original has the last page.

On the other hand, in case of a plurality of double-sided image bearing originals having successive pages, the arrangement of the originals oh the original table is such that the front side of the uppermost original has the first page, and the back side of the uppermost original has the second page, while the back side of the lowermost original has the last page.

The known ADF comprises an original receiving tray for receiving therein the original after the scanning of the original has been completed. The originals are fed one by one from the original table to the original supporting station of the apparatus in order from the lowermost original. At this stage, each of the originals is reversed upside down.

Accordingly, in case of the single-sided image bearing originals having successive pages the lowermost original having the last page arrives at the original supporting station in the state that the front side thereof, i.e., the last page, faces downward. On the other hand, in case of the double-sided image bearing originals having successive pages, the lowermost original having the last page arrives first at the original supporting station in the state that the front side thereof, i.e., the page before the last page, faces downward.

In case of the single-sided image bearing originals, the scanning of the under surface of the original having the last page is effected after the original has arrived at the original supporting station. Namely, the last page is copied at this stage. On the other hand, in case of the double-sided image bearing originals, the scanning of the under surface of the original having the last page is not effected at this stage.

In case of the single-sided image bearing originals, the original having the last page is then discharged from the original supporting station to the original receiving tray while being reversed upside down.

In this way, the single-sided image bearing originals are copied and then stacked on the original receiving tray in order from the last page.

On the other hand, in case of the double-sided image bearing originals, the original having the last page is removed from the original supporting station immediately after it has arrived at the original supporting station and then returned to the original supporting station through a reversing path while being reversed upside down. Accordingly, at this stage, the original on the original supporting station is in the state that the last page is oriented downward.

After the scanning of the under surface of the original having the last page has been completed, the original having the last page is removed again from the original supporting station and then returned again to the original supporting station through a reversing path while being reversed upside down. Accordingly, at this stage, the original on the original supporting station is in the state that the page before the last page is oriented downward.

After the scanning of the under surface of the original having the last page has been completed again, the original having the last page is discharged from the original supporting station to the original receiving tray while being reversed upside down. Accordingly, the original having the last page is stacked in the state that the last page is oriented downward.

In this way, the double-sided image bearing originals are copied and then stacked on the original receiving tray in order from the last page.

The above-mentioned known automatic document feeder has the following disadvantages.

It is often desired to affix successive page numbers to the transfer papers so as to correspond to those of originals having successive pages. For this purpose, the originals having successive pages have to be copied in order from the first page. However, in the known automatic document feeder, the originals are copied in order from the last page, as described above. In this case, it is necessary first to affix a last page number to the copied transfer paper. However, generally, it is impossible, in the known automatic document feeder or the copying apparatus, to determine a total number of the originals stacked on the original table. Therefore, it is impossible to affix successive page numbers to the respective transfer papers.

Further, when a paper jam of the original has occurred, it is necessary to reset the jammed original on the original table. In this case, in the known automatic document feeder, the remaining pages of the originals have to be removed from the original table, in order to place the jammed original below the remaining pages of the originals, resulting in a complicated resetting operation for the original.

SUMMARY OF THE INVENTION

It is therefore an object of the present invention to provide an automatic document feeder for an image processing apparatus, which makes it possible to scan a plurality of originals in order from the first page and in order from the uppermost original on the original table, and which also makes it possible to stack the originals in order of page after the scanning of each of the original has been completed, in either case of single-sided image bearing originals or double-sided image bearing originals.

The object of the invention can be achieved by an automatic document feeder for use in combination with an image processing apparatus having an original supporting station for supporting thereof an original and which is selectively operative in a first scanning mode for scanning one side of the original and in a second scanning mode for scanning opposite sides of the original, the automatic document feeder comprising: an original table which is capable of stacking thereon a plurality of originals to be scanned; first and second trays each for receiving therein the originals; a first conveying means for conveying the originals one by one from the original table to the original supporting station in order from the uppermost original, the first conveying means being capable of reversing each of the originals upside down while conveying the same; a second conveying means for conveying the original from the original supporting station to the first tray, without reversing the original upside down, after the scanning of one side of the original in the first scanning mode has been completed; a third conveying means for removing the original from the original supporting station and then returning the same to the station, while reversing the original upside down, after the scanning of one side of the original in the second scanning mode has been completed; and a fourth conveying means for conveying the original from the original supporting station to the second tray, while reversing the original upside down, after the scanning of the other side of the original in the second scanning mode has been completed.

In the automatic document feeder having the above-mentioned construction, a plurality of originals, which may be single-sided image bearing originals or double-sided image bearing originals, are stacked on the original table in order of page in such a manner that the upper surface of the uppermost original has the first page.

The originals are conveyed one by one from the original table to the original supporting station of the image processing apparatus through the first conveying mechanism in such a manner that the uppermost original having the first page is conveyed first. Each of the originals is reversed upside down while being conveyed through the first conveying mechanism. For example, when the original having the first page has arrived at the original supporting station, the first page is oriented downward. Accordingly, the first page is scanned first when the original having the first page is a single-sided image bearing original or a double-sided image bearing original.

In case of the single-sided image bearing original, the original having the first page is then conveyed from the original supporting station to the first tray through the second conveying station without being reversed upside down. Accordingly, the single-sided image bearing original having the first page is stacked first on the first tray in the state that the first page is oriented downward. In this way, the single-sided image bearing originals are scanned one by one in order from the first page and stacked one by one on the first tray in order from the first page.

On the other hand, in case of the double-sided image bearing original, after the first page has been scanned, the original having the first and second pages is removed from the original supporting station and then returned to the original supporting station through the third conveying station while being reversed upside down. Accordingly, when the original having the first and second pages arrives again at the original supporting station, the second page is oriented downward. At this stage, the second page is scanned. The original having the first and second pages is then conveyed from the original supporting station to the second tray through the fourth conveying station while being reversed upside down. Accordingly, the double-sided image bearing original having the first and second pages is stacked first on the second tray in the state that the first page is oriented downward. In this way, the double-sided image bearing originals are scanned one by one in order from the first page and then stacked one by one on the second tray in order from the first page. Therefore, the above-mentioned construction of the automatic document feeder makes it possible to easily affix successive page numbers to the respective transfer papers.

When a paper jam of an original has occurred, the jammed original has to be reset in place on the original table. In this case, in the automatic document feeder according to the invention, it is only necessary to place the jammed original on the remaining part of the originals on the original table. Accordingly, it is possible to simplify the resetting operation for the jammed original.

Preferably, the first, third and fourth conveying station are located at one end of the original supporting station, while the second conveying station is located at the other end of the original supporting station. In this construction, it is possible to minimize the overall length of movement of the original along the conveying path in the automatic document feeder, resulting in reduced conveying time of the original.

Further objects, features and advantages of the present invention will become apparent from the foiling description of the preferred embodiments of the invention as illustrated in the accompanying drawings.

DESCRIPTION OF THE PREFERRED EMBODIMENTS

Figure 1:
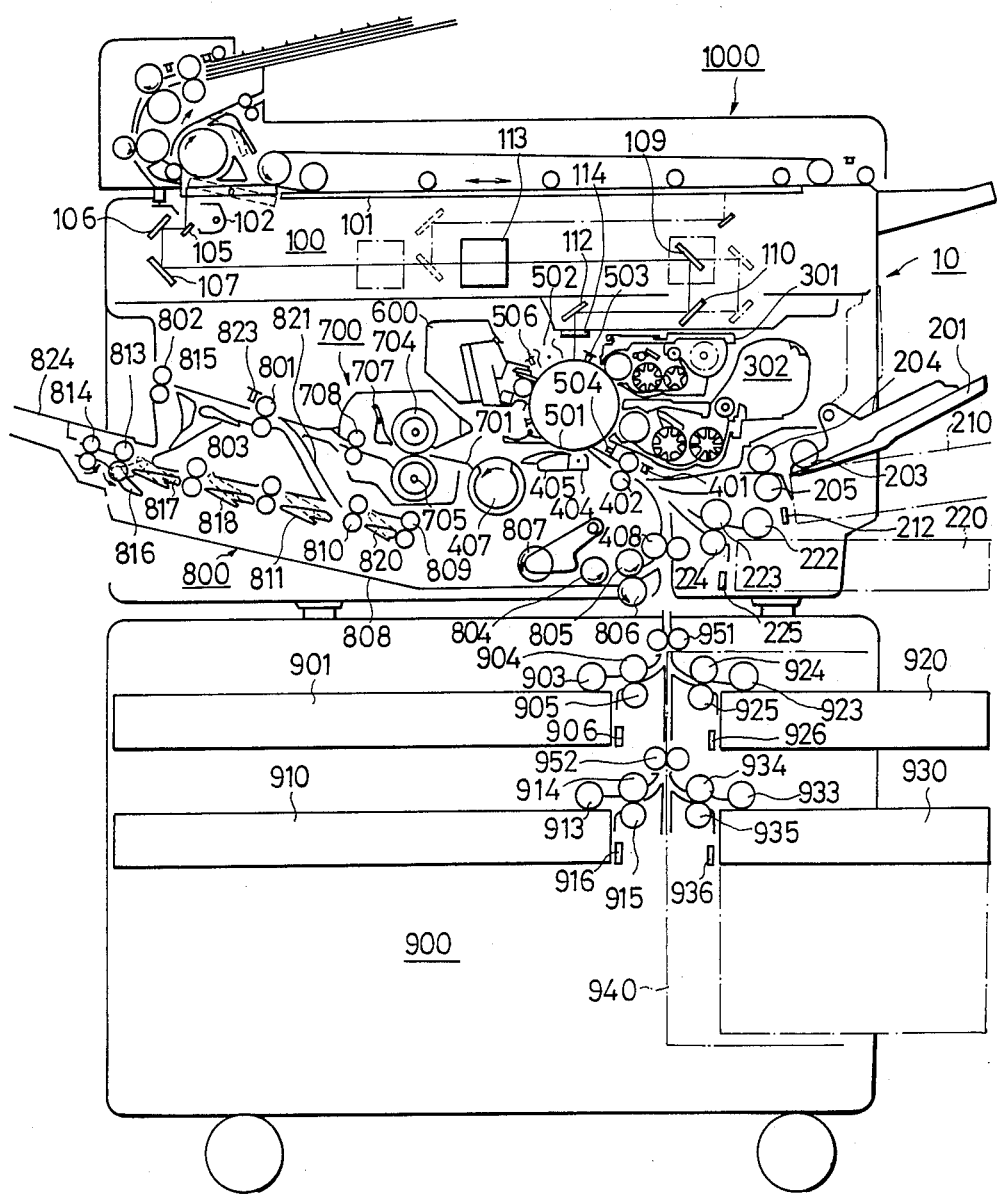
FIG. 1 is a schematic cross-sectional elevational view of the copying apparatus provided with an automatic document feeder according to a first preferred embodiment of the present invention.

FIG. 1 is a cross-sectional view schematically illustrates the whole construction of a copying apparatus, as an image processing apparatus. The copying apparatus is composed of a main body 10, which is specifically shown in FIG. 2, a multi-staged paper feeding unit 900, which is specifically shown in FIG. 3, and an automatic document feeder (ADF) 1000, according to a first embodiment of the present invention, which is specifically shown in FIGS. 4 and 5.

Figure 2:
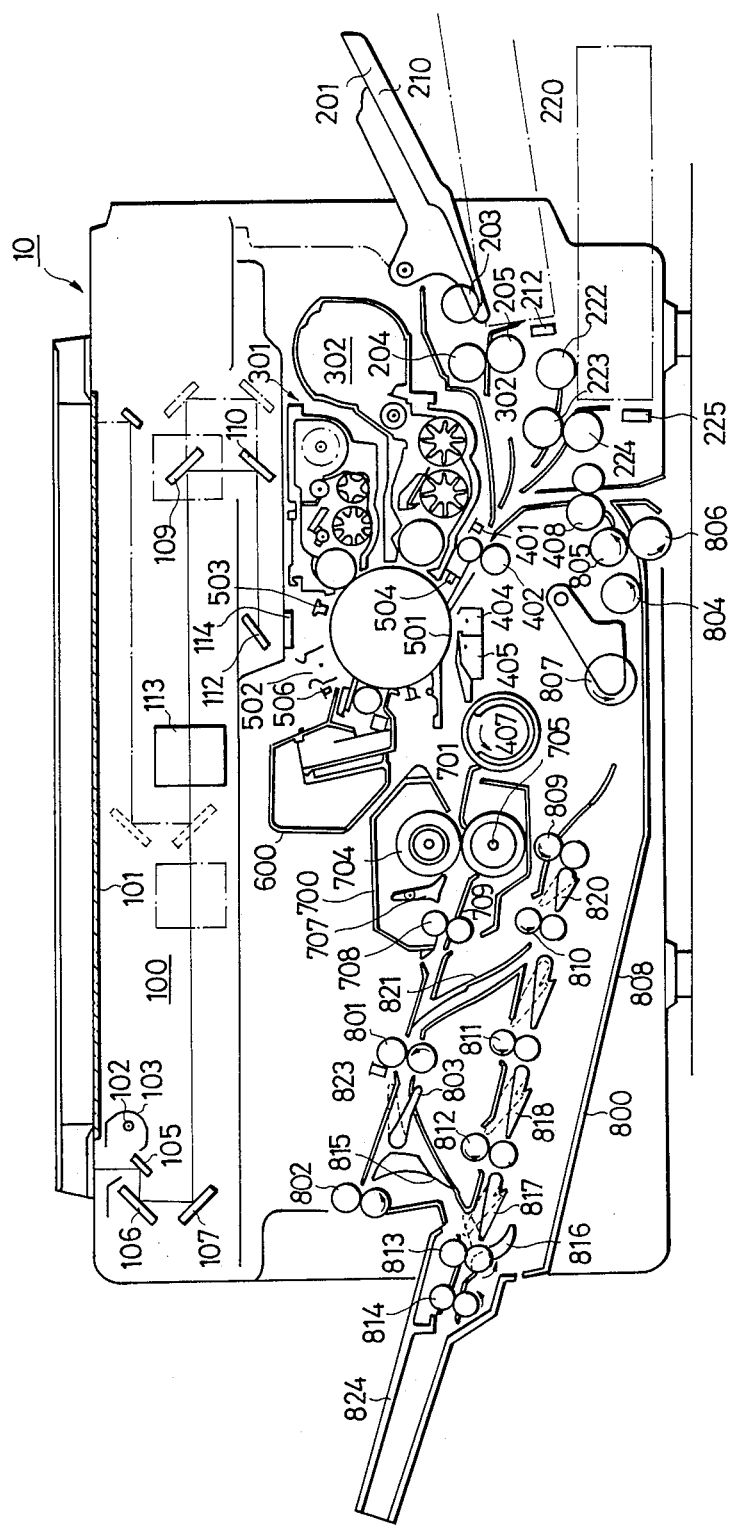
FIG. 2 is an enlarged schematic cross-sectional elevational view of a main body of the copying apparatus shown in FIG. 1.

Referring to FIGS. 1 and 2, the main body 10 of the copying apparatus is provided therein with a photosensitive drum 501 which can be driven for rotation in a clockwise direction, seen in FIGS. 1 and 2. A charge elimination lamp 506, an electric charger 502, an erase lamp 503, a first developing device 301, a second developing device 302, a charge preelimination lamp 504, a transfer charger 404, a separation charger 405, and a cleaning device 600 of a blade type are arranged in place around the outer periphery of the drum 501, respectively. A photoconductive layer is provided on the periphery of the photosensitive drum 501. The photoconductive layer can be charged uniformly by means of the electric charger 502 and then can be subjected to an optical exposure of an original image through an optical scanning system 100.

The optical scanning system 100 for scanning the original image is arranged under a contact glass 101, for supporting thereon the original, which serves as an original supporting station of the copying apparatus body 10. The optical scanning system 100 is composed of a light source 102, a movable mirrors 105, 106, 107, 109, and 110, a lens 113 and a stationary mirror 112.

The light source 102 and the movable mirror 105 together can be driven by a common drive motor (not shown) so as to move from their respective rest positions, as illustrated in FIGS. 1 and 2, toward the right side of the body 10, seen in FIGS. 1 and 2, at a speed V/m with respect to a peripheral speed V of the drum 501, in which "m" represents a copy magnification ratio. The movable mirrors 106 and 107 together can be driven by the common drive motor so as to move from their respective rest positions, as shown in FIGS. 1 and 2, toward the right-hand side of the body 10 at a speed V/2 m. The peripheral speed V of the drum 501 is maintained in constant irrespectively of the copying mode for an equi-magnification, a reduced magnification or an enlarged magnification.

To ensure the optical path having a length which depends on the copy magnification ratio, the mirrors 109 and 110 together and the lens 113 are displaced along the optical path, respectively, in accordance with changes in the copy magnification ratio. Reference numerals 114 designates a dustproof glass which is provided for isolating the whole image receiving and transforming components, such as the drum, from the optical system.

On the other hand, disposed at the right-hand side of the copying apparatus body, seen in FIGS. 1 and 2, are a first upper and second lower paper feeders 210 and 220, each being in the form of a cassette, which are provided with pick up rollers 203 and 222, send rollers 204 and 223 and separation rollers 205 and 224, respectively. A paper conveying path is defined by a pair of register rollers 402, a suction conveyor roller 407, a fixing device 700, a pair of intermediate discharge rollers 801, and a pair of main discharge rollers 802. Reference numerals 212 and 225 designate paper size detecting switches, respectively.

Provided before the register rollers 402, seen in the direction of conveying of the transfer paper, is a paper sensor 401 for controlling ON/OFF operation of the register rollers 402.

Provided above the first upper paper feeder 210 is a manual paper feeder 201 for allowing manual insertion of the transfer papers to be copied. The manual paper feeder 201 is provided with a size sensor (not shown) for detecting the size of the width of the transfer paper.

The manual paper feeder 201 is pivotable between its open state for allowing the manual insertion of the transfer papers and its closed state for obstructing the same. A sensor (not shown) is provided for detecting whether or not the manual paper feeder 201 is in the open state. Based on the detecting operation of this sensor, a pressure arm (not shown), which is capable of being energized to apply a pressurizing force on the transfer papers in the cassette of the first paper feeder 210, is so controlled as to be deenergized to release the pressurizing force from the transfer papers in the cassette when the manual paper feeder is in the open state. Namely, when the manual paper feeder is in the open state, the feeding of the transfer papers from the cassette is obstructed.

The transfer paper fed from one of the first, second and manual paper feeders 201, 210 and 220, is brought into contact with a toner image on the photosensitive drum 501 with accurate timing by means of the register rollers 402.

The toner image is then transferred on the upper surface of the transfer paper by means of the transfer charger 404, and the transfer paper is then separated from the photosensitive drum 501 by means of the separation charger 405.

The separated transfer paper is then sucked on the peripheral surface of the suction convey roller 407 and fed thereby to a guide plate 701 of the fixing device 700. In the fixing device 700, the toner image on the upper surface of the transfer paper is fixed thereon by means of a fixing roller 704 and a pressure roller 705.

The fixed transfer paper is then separated from the fixing roller 704 by means of a separation claw 707 and fed through a pair of output rollers 708 of the fixing device 700 to the intermediate discharge rollers 801. At this time, a gate 803 is located at a position as represented by a broken line in FIGS. 1 and 2, and, accordingly, the fixed transfer paper, i.e., the copied paper is then led into a paper reversing portion in which the copied paper is advanced by means of two pair of conveyor rollers 813 and 814.

At the end of a predetermined time-lag after the trailing edge of the copied paper has been detected by a paper sensor 823, a gate 818 is turned to a position as represented by a broken line, and the conveyor rollers 813 and 814 are reversed in the counterclockwise direction, causing the copied paper to move back to the main discharge rollers 802. In this manner, the copied paper is reversed upside down. Accordingly, after being discharged from the main body 10 by means of the main discharge rollers 802, the copied paper is received in and stacked on the paper tray 824 with the copied surface thereof oriented downward.

The gate 815 has a lower tip end made of a flexible film which allows the copied paper to pass therethrough to the paper reversing portion and serves to prevent the copied paper from turning back the way it has come therethrough.

In this embodiment, the originals are fed by the automatic document feeder in order of page, as will be described later in detail. Accordingly, in case of the above-described single-sided copy operation, the papers with one side thereof copied are stacked on the paper tray 824 in order of page, because the papers with one side thereof copied are stacked one by one on the tray 824 with the copied surface thereof oriented downward, as described above.

In the bottom side of the copying apparatus main body 10 within the area between the left side and the center thereof, seen in FIGS. 1 and 2, there is provided a paper recirculating portion 800 which is connected to the above-mentioned paper reversing portion and is used when a double-sided copy operation is effected.

The paper recirculating portion 800 has two conveying paths, one for a small-sized paper such as a transversely postured A-4 size paper or a paper which is smaller than the transversely postured A-4 size paper, and the other for a large-sized paper which is larger than the transversely postured A-4 size paper.

In case of the double-sided copy making operation for the above-mentioned small-sized paper, the paper having a first side, which has already been copied, is fed out from the fixing device 700 through the output rollers 708 to the intermediate discharge rollers 801. At this time, the gate 803 is located at a position as represented by a solid line in FIGS. 1 and 2, and accordingly the paper is further fed to the main discharge rollers 802 until the trailing edge of the paper with the first side thereof copied is detected by a paper detecting sensor 823.

When the trailing edge of the paper with the first side thereof copied is detected by a paper detecting sensor 823, the intermediate discharge rollers 801 and the main discharge rollers 802 are turned to rotate in the reversal direction i.e. the counterclockwise direction, seen in FIGS. 1 and 2, and thus the paper with the first side thereof copied is fed to a guide plate 821 with the above-mentioned trailing edge turned to the leading edge, seen in the direction of feeding of the paper, and further to a position at which the paper is held by a pair of conveyor rollers 810.

In case of a transversely postured A-5 size paper or a half letter size (HLT size) paper, a gate 820 is located at a position as represented by a solid line, and thus the first side thereof copied is stacked on a recirculation tray 808 by means of a pair of conveyor rollers 809.

On the other hand, in case of a transversely postured A-4 size paper or a transversely postured B-5 size paper, the gate 820 is located at a position as represented by a broken line, and thus the first side thereof copied is fed to the recirculation tray 808 immediately after passing through the conveyor rollers 810.

In case of the mode of operation for obtaining a plurality of double-sided copies (the number thereof is N) from one original, i.e., the so-called 1 to N mode, the above-mentioned processes are repeated N times, and thus N papers with the first side thereof copied are stacked one by one on the recirculation tray 808. In this case, preferably, the leading edges of all of the papers with the first side thereof copied are brought into alignment with each other by means of a take in roller 807.

When all of the N papers with the first side thereof copied are stacked on the recirculation tray 808, the second side copy operation is started. First, the uppermost paper with the first side thereof copied is fed from the tray 808 by means of a pick up roller 804, a feed roller 805 and a separation roller 806 through a pair of conveyor rollers 408, and arrives at the register rollers 402. During this process, a toner image corresponding to an image on the second side (the back side in caser of a double-sided image bearing original) of the original is formed on the photosensitive drum 501.

The second side of the paper with the first side thereof copied is then brought into contact with the toner image on the photosensitive drum 501 with accurate timing by means of the register rollers 402. After that, the paper is subjected to the same processes as those in the single-sided copy operation and arrives at the intermediate discharge rollers 801. At this time, since the gate 803 is located at the position as illustrated by a solid line, the paper is fed out from the copying apparatus main body 10 through the main discharge rollers 802, and stacked on the tray 824 with the first side thereof oriented downward and the second side thereof oriented upward.

Next, explanation will be made as to the double-sided copy making operation for a longitudinally postured A-4 size paper or a paper which is larger than the longitudinally postured A-4 size paper. When the paper with the first side thereof copied arrives at the intermediate discharge rollers 801 through the output rollers 708 of the fixing device 700, the gate 803 is located at the position as represented by a broken line. Accordingly, the paper is further fed toward the conveyor rollers 813 and 814.

At the end of a predetermined time-lag after the trailing edge of the copied paper has been detected by the paper detecting sensor 823, the conveyor rollers 813 and 814 are reversed to rotate in the counterclockwise direction, causing the paper to switch back with the above-mentioned trailing edge thereof changed to a leading edge.

At this time, in case of a A-3 size paper or a 17 inch (43.18 cm) size paper, a gate 817 is located at a position as represented by a broken line in FIGS. 1 and 2. Accordingly, the paper with the fist side thereof copied is then fed directly to the recirculation tray 808.

On the other hand, in case of a B-4 size paper or a 14 inch (35.56 cm) size paper, another gate 818 is located at a position as represented by a broken line, and the paper with the fist side thereof copied is fed through the gate 818 to the recirculation tray 808, while in case of a longitudinally postured A-4 size paper or a longitudinally postured B-5 size paper, another gate 811 is located at a position as represented by a broken line, and the paper with the fist side thereof copied is fed through the gate 811 to the recirculation tray 808. The paper conveying operation from the tray 808 to the tray 814 is the same as that for the above-described transversely postured A-4 size paper.

In the above-mentioned construction of the paper recirculation portion 800, it is possible to switch back as fast as possible a transversely postured A-4 size paper or a paper which is smaller than the transversely postured A-4 size paper, resulting in a reduced time necessary for stacking the paper on the circulation tray 80.

Figure 3:
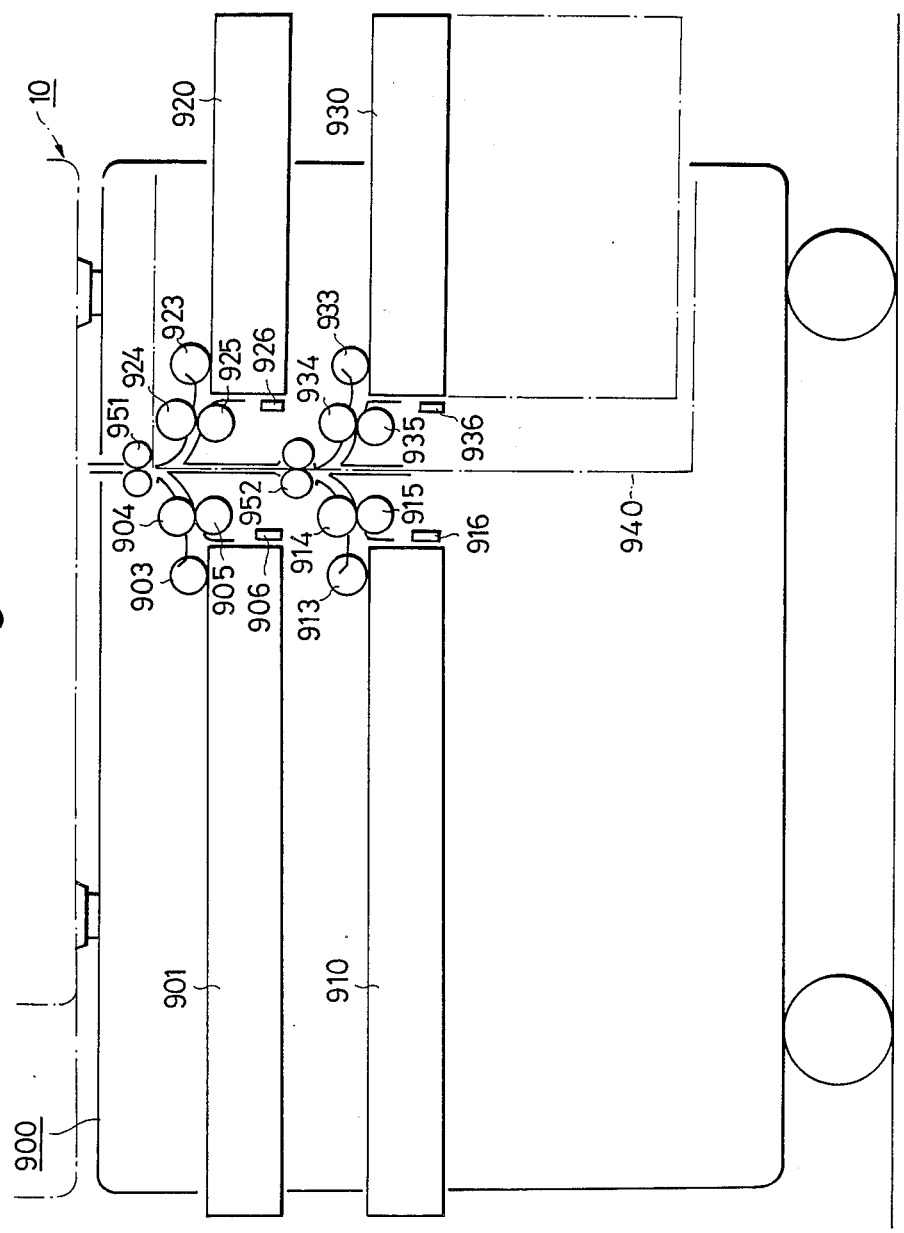
FIG. 3 is an enlarged schematic cross-sectional elevational view of a paper feeding unit of the copying apparatus shown in FIG. 1.

Next, explanation will be made as to the multi-staged paper feeding unit 900. Referring to FIGS. 1 and 3, The multi-staged paper feeding unit 900 is removably attached to the bottom side of the copying apparatus main body 10. Although the main body 10 is provided with two cassette-type feeders 210 and 220, as described above, the multi-staged paper feeding unit serves to feed selectively a more great number of various size of transfer papers.

The multi-staged paper feeding unit 900 comprises a third, fourth, fifth, and sixth paper feeders 910, 920, 930 and 940 of a cassette type. Particularly, the sixth paper feeder 940 is formed as a large-sized cassette tray which can feed a great number of equal-sized transfer papers.

Applied to the feeders 910, 920, 930 and 940 of the multi-staged paper feeding unit 900 are paper feed out systems of a reverse roller type, respectively, which are comprised of pick up rollers 903, 913, 923 and 933, feed rollers 904, 914, 924 and 934, and separation rollers 905, 915, 925 and 935, respectively, as similar to those in the copying apparatus main body 10. Two pair of rollers 951 and 952 are provided for conveying the transfer papers toward the main body 10.

Provided in the unit 900 are paper size detecting switches 906, 918, 928 and 936 which can detect the size of the transfer papers stored in the third through sixth paper feeders 910, 920, 930 and 940.

Explanation will now be made as to the operation of the unit 900. In a case that, for example, the fourth paper cassette 910 is now selected. First, the pick up roller 913 is rotated in the counterclockwise direction, seen in FIG. 3.

Rotating the pick up roller 913 causes several transfer papers in the cassette 910 to move to the feed roller 914 and the separation roller 915. However, the feed roller 914, which is driven to rotate in the counterclockwise direction, and the aeparation roller 915, which is urged so as to be able to rotate in the counterclockwise direction only when a load having a torque less than a predetermined torque is applied thereto, together feed only the uppermost transfer paper out of the cassette 910 toward the conveyor rollers 952.

Then, the transfer paper is conveyed through the conveyor rollers 951 and 408 and then arrives at the register rollers 402. At the end of a predetermined time-lag after the paper has been detected by the paper sensor 401, the conveyor rollers 408, 951 and 952 are de-energized. After that, the transfer paper is subjected to a process which is the same as that for the transfer paper fed from one of the cassette in the main body 10.

Although in the above-described multi-staged paper feeding unit, the cassettes 901 and 910 for storing large-sized transfer papers are disposed in the left hand side of the unit 900, while the other cassettes 920 and 930 for storing small-sized transfer papers are disposed in the right hand side of the unit 900, the arrangement of the cassettes is not limited thereto.

As schematically represented by a dotted line in FIG. 3, a casing of the illustrated unit 900 has an opening 940 which is covered with a removable door. If a paper jam occurs in one of the cassettes or the paper conveying path in the unit 900, it will be possible to remove easily the jammed paper through the opening 949.

In the illustrated multi-staged paper feeding unit, four paper feeders are separated right and left, which can make it possible to reduce the paper conveying path in the multi-staged paper feeding unit and thereby to reduce time necessary to convey the transfer paper, and which can also make it possible to locate the cassettes at respective positions far from the floor and thereby to provide an easy operation of the cassettes for operators.

Next, explanation will be made as to the construction of the automatic document feeder according the first embodiment of the present invention.

Figure 4:
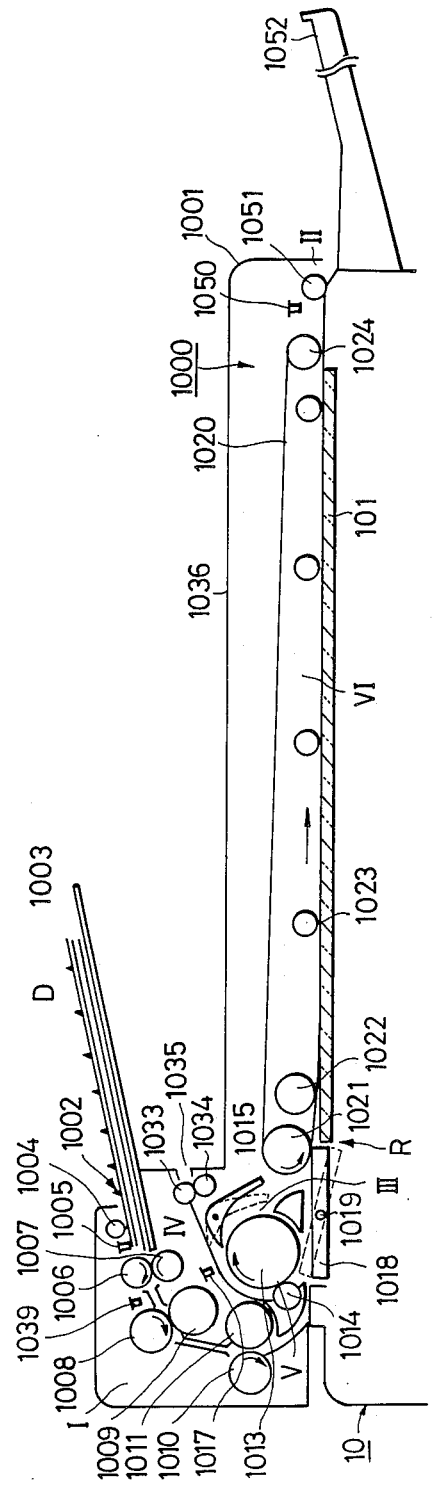
FIG. 4 is an enlarged schematic cross-sectional elevational view of the automatic document feeder shown in FIG. 1.
Figure 5:
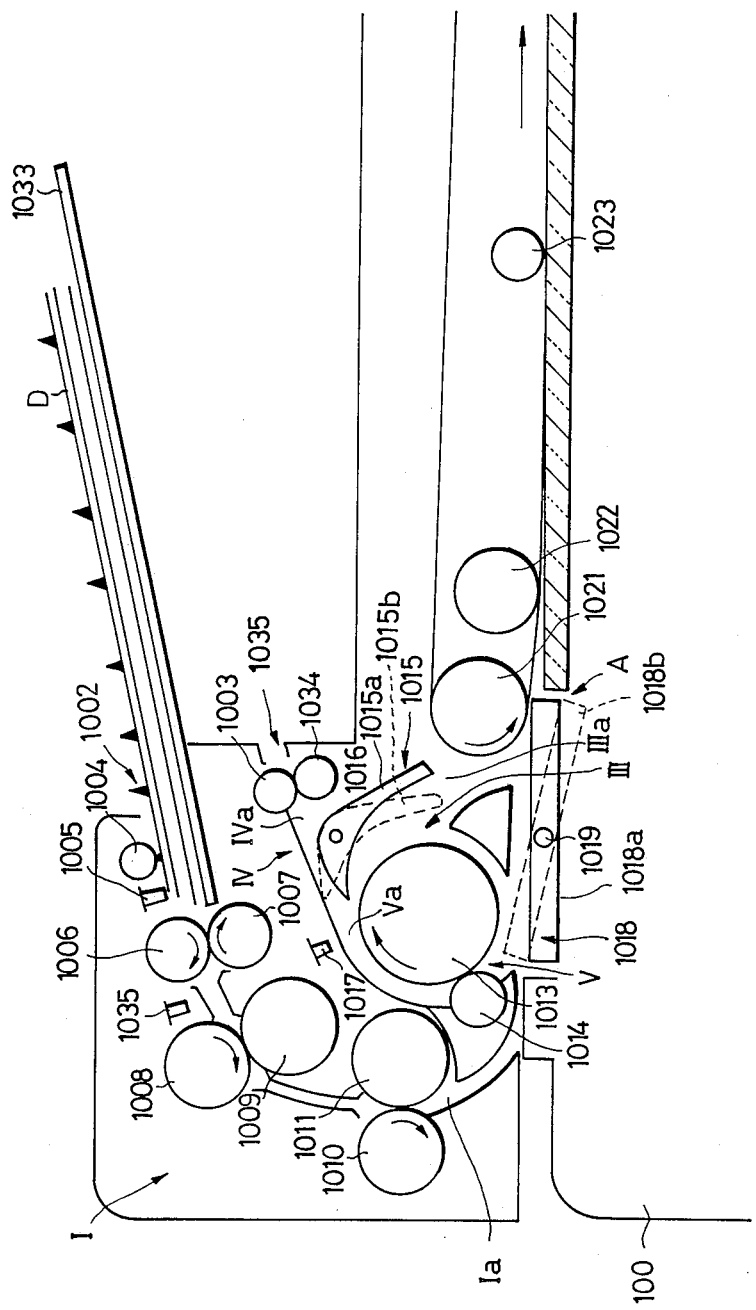
FIG. 5 is a further enlarged cross-sectional elevational view of the main part of the automatic document feeder shown in FIG. 4.

FIG. 4 is a schematic cross-sectional view of the automatic document feeder, and FIG. 5 is an enlarged cross-sectional view of the main part of the automatic document feeder shown in FIG. 4.

Referring to FIGS. 4 and 5, the automatic document feeder (ADF) 1000 is provided on the contact glass 101 mounted on the top of the copying apparatus main body 10. The copying apparatus is selectively operatable in a single-sided image scanning mode for making a single-sided copy and a double-sided image scanning mode for making a double-sided copy. As previously described, the contact glass 101 is provided for supporting thereon an original so that the original thereon can be subjected to an image scanning operation of the copying apparatus.

The ADF 1000 comprises an original table 1003 for stacking thereon a plurality of originals D, each having a front and back sides, in the state that each of the front sides of the originals D faces upward. The ADF 1000 further comprises a first and second original receiving trays 1052 and 1036 each for successively receiving and stacking therein the originals. In this copying apparatus main body 10, while the second tray 1036 as well as the original table 1003 is formed integrally with the casing 1001 of the ADF 1000, which is pivotably attached to the main body 10.

The ADF 1000 further comprises an original feeding unit I as a first original conveying means, which is provided for feeding the originals D one by one from the original table 1003 to the contact glass 101 in order from the uppermost original. While reversing each of the originals upside down so that the front side of each of the originals faces downward when it arrives at the contact glass 101. The original feeding station I comprises an original inlet port 1002, a pick up roller 1004, a first original sensor 1005, a separation roller 1006, an obstructing roller 1007, a second sensor 1039, a pair of pull out rollers 1008 and 1009 and another pair of pull out rollers 1010 and 1011. The rollers of the original feeding station I defines an original feeding path Ia which extends between the original table 1003 and the upper surface of the contact glass 101.

The ADF 1000 further comprises a first original discharging unit II as a second original conveying means, which is provided for conveying each of the originals from the contact glass 101 to the first original receiving tray 1052 while maintaining each of the originals in the state that the front side thereof faces downward. The first discharging station II comprises a third original sensor 1050 and a discharge roller 1051. The first discharging station II is adapted to be activated after each of the originals has been subjected at the front side thereof to the image scanning operation of the copying apparatus, only when the copying apparatus is operated in the single-sided image scanning mode, as will be described later in detail.

The ADF 1000 further comprises an original circulating unit III as a third original conveying means, which is provided for removing each of the originals from the contact glass 101 and then returning the same to the contact glass 101 while reversing each of the originals upside down so that the back side of each of the originals faces downward when the corresponding original is returned to the contact glass 101. The original circulating station III is adapted to be activated after each of the originals has been subjected at the front side thereof to the image scanning operation of the copying apparatus, only when the copying apparatus is operated in the double-sided image scanning mode.

The ADF 1000 further comprises a second original discharging station IV as a fourth original conveying means, which is provided for conveying each of the originals from the contact glass 101 to the second original receiving tray 1036 while reversing each of the originals upside down so that the front side of each of the originals faces downward when the corresponding original is received in the second original tray 1036. The second discharging station IV comprises a pair of discharge rollers 1033 and 1044 and an original discharge port 1035. The second discharging station IV is adapted to be activated after each of the originals has been subjected at the back side thereof to the image scanning operation of the copying apparatus, only when the copying apparatus is operated in the double-sided image scanning mode.

The original circulating station III and the second discharging station IV together comprise a common reversing unit V comprised of a reversing roller 1013 and a driven roller 1014 which together are adapted to conveying an original through a reversing path Va while reversing the same upside down.

The original circulating station III defines a return path IIIa which extends between the reversing path Va of the common reversing unit V and the upper surface of the contact glass 101.

On the other hand, the second discharging station defines a discharge path Va which extends between the reversing path Va of the common reversing unit V and the second original receiving tray 1036.

Further, the common reversing unit V is provided with a first change-over claw 1015 for selectively connecting the common reversing path Va to the return path IIIa of the original circulating station III or the discharge path Va of the second discharging station IV to the common reversing unit. More particularly, the first change-over claw 1015 is pivotably attached to the casing 1001 of the ADF 1000 by a pivot pin 1016 and is capable of being pivotally moved by an actuator (not shown) between a first position 1015a, as shown by a solid line, at which the claw 1015 connects the reversing path Va to the discharge path IVa while disconnecting the return path IIIa from the reversing path Va, and a second position 1015b, as shown by a broken line, at which the claw 1015 connects the reversing path Va to the return path IIIa while disconnecting the reversing path Va from the discharge path IVa.

The common reversing unit V further comprises a second change-over claw 1018 for selectively connecting the upper surface of the contact glass 101 to the conveying path Ia of the original feeding station I or the reversing path Va of the common revering unit V. More particularly, the second change-over claw 1018 is pivotably attached to the copying apparatus main body 10 by a pivot pin 1019 and is capable of being pivotally moved by an actuator, such as solenoid (not shown), between a first position 1018a, shown by a solid line, at which the claw 1018 connects the upper surface of the contact glass 101 to the conveying path Ia of the original feeding station I while disconnecting the upper surface of the contact glass 101 from the reversing path Va of the common reversing unit V, and a second position 1018b, shown by a broken line, at which the claw 1018 connects the upper surface of the contact glass 101 to the reversing path Va while disconnecting the upper surface of the contact glass 101 from the conveying path Ia of the original feeding station I.

A fourth original sensor 1017 is provided for detecting the original conveyed through reversing path Va of the common reversing unit V.

The original feeding station I, the first discharging station II, the original circulating station III, and the second discharging station IV together comprise a common conveyor unit VI for conveying the original in forward and backward directions along the contact glass 101. The common conveyor unit VI comprises an endless belt 1020 which is supported on a belt drive roller 1021 and a driven roller 1024. A stationary roller 1022 and a plurality of pressure rollers 1023 are arranged between the belt drive roller 1021 and the driven roller 1024.

In this embodiment, the second change-over claw 1018 is formed with an end portion for positioning one side edge of the original on the contact glass 101, and the endless transport belt 1020 is adapted to move the original, fed onto the contact glass 101 so that the one side edge of the original is abutted on the end portion of the second change-over claw 1018. Namely, the second change-over claw 1018 also serves as an original positioning scale.

Next, explanation will be made as to the operation of the ADF 1000 for making the copies from single-sided image bearing originals.

When a print start key (not shown) is made ON, the uppermost original of the originals D stacked on the original table 1003 is first fed from the original table 1003 to the pull out rollers 1008 and 1010 by means of the rollers 1004, 1006 and 1007. The original is further fed through the second change-over claw (scale) 1018 to the upper surface of the contact glass 101. At this time, the claw 1018 is located at the first position 1018a. The first sensor 1005 can detect presence or absence of original at the outlet of the original table 1003. The length of the original in the feeding direction thereof is detected by the second sensor 1039, whereby the length of driving time of the conveyor belt 1020 is determined.

The original is reversed upside down while being conveyed through the original feeding station I, so that the image bearing surface of the original is oriented downward when the original arrives at the upper surface of the contact glasa 101.

When the trailing edge of the original has passed through the second change-over claw 1018, the belt drive roller 1021 is reversed to move the lower part of the conveyor belt 1020 toward the left, seen in FIG. 4, whereby the original is moved back until the left side edge thereof abuts on the right end portion of the claw 1018 which is located at the first position 1018a. Accordingly, the original is located at a predetermined reference position R with respect to the scanning optical system 100 of the copying apparatus. The belt drive roller 1021 continues a slight rotation thereof after the left side edge of the original has abutted on the claw 1018, in order to rectify the registration and skew of the original. At this time, slip occurs between the original and the conveyor belt 1020.

After the scanning exposure process has been effected, the belt drive roller 1021 is rotated in the counterclockwise direction so as to move the under part of the conveyor belt 1020 toward the right, seen in FIG. 4, whereby the original on the upper surface of the contact glass 101 is conveyed to the discharge roller 1051 which also convey the original to the first tray 1052 without reversing the original upside down. Accordingly, the original is stacked on the first tray 1052 with the image bearing surface thereof oriented downward. In this way, all of the originals are fed one by one in order of page from the table 1003 to the upper surface of the contact glass 101 and then discharged to the tray 1052 in order of page. Accordingly, the originals are stacked on the tray 1052 in order of page.

Next, explanation will be made as to the case of making the copies from the double-sided image bearing originals. In this case, the double-sided originals having successive pages are stacked on the table 1003 in order of page in the state that the front side of uppermost original, i.e., the first page, is oriented upward and the back side of the uppermost original, i.e., the second page, is oriented downward.

After the original having the first and second pages has arrived at the upper surface of the contact glass 101, the front side of the original, i.e., the first page is scanned in the same manner as that for the above-described single-sided original. In this state, the left side edge of the original is abutted on the right end portion of the second change-over claw 1018 which is located at the first position 1018a.

When the scanning of the first page has been completed, the second change-over claw 1018 is moved to the second position 1018b, whereby the upper surface of the contact glass 101 is connected to the reversing path Va of the common reversing unit V through the claw 1018 while being disconnected from the conveying path Ia of the original feeding station I. Then, the belt drive roller 1021 is rotated in the clockwise direction, whereby the original On the contact glass 101 is conveyed by means of the conveyor belt 1020 toward the reversing path Va of the common reversing unit V through the claw 1018. In the common reversing unit V, the original is conveyed through the reversing path Va by means of the rollers 1013 and 1014 while being reversed upside down. At this time, the first change-over claw 1015 is located at the second position 1015b. Accordingly, the original is conveyed through the first change-over claw 1015 to the return path IIIa of the original circulating station III and thus returned to the upper surface of the contact glass 101 in the state that the second page is oriented downward.

When the leading edge of the original is detected by the fourth sensor 1017, the drive roller 1021 is caused to rotate in the counterclockwise direction, and thus the lower part of the conveyor belt 1020 is moved toward the right. At this time, the second change-over claw 1018 is moved to the first position 1018a. Accordingly, when the leading edge of the original arrives at the upper surface of the contact glass 101, the original is further conveyed along the upper surface of the contact glass 101 by means of the conveyor belt 1020. After that, as like as the operation for scanning the front side of the original, the left side edge of the original is abutted on the right end portion of the second change-over claw 1018 by the reverse movement of the conveyor belt 1020 and then scanning of the back side of the original, i.e., the second page, is effected.

When the scanning of the second page is completed, the second change-over claw 1018 is moved to the second position 1018b again, whereby the upper surface of the contact glass 101 is connected to the reversing path Va of the reversing unit V while being disconnected from the conveying path Ia of the original feeding station I. On the other hand, the first change-over claw 1015 is moved to the first position 1015a, whereby the reversing path Va of the common reversing unit V is connected to the discharge path IVa of the second discharging station IV while disconnected from the return path IIIa of the original circulating station III. In this state, the belt drive roller 1021 is rotated in the clockwise direction, whereby the original on the contact glass 101 is conveyed by means of the conveyor belt 1020 through the second changeover claw 1018 to the reversing path Va of the common reversing unit V. The original is further conveyed by means of the rollers 1013 and 1014 while being reversed upside down and further conveyed through the first change-over claw 1015 to the discharge path Va of the second discharging station V. The original is further conveyed by means of the discharge rollers 1033 and 1034 through the discharge port 1035 to the second tray 1036. Accordingly, the original having the first and second pages is stacked on the second tray 1036 in the state that the front side thereof, i.e., the first page, is oriented downward. Similarly, the remaining originals are stacked one by one in order of page.

Next, explanation will be made in more detail as to the operative relationship between the main components of the ADF 1000 with reference to FIGS. 6 and 7.

Figure 6:
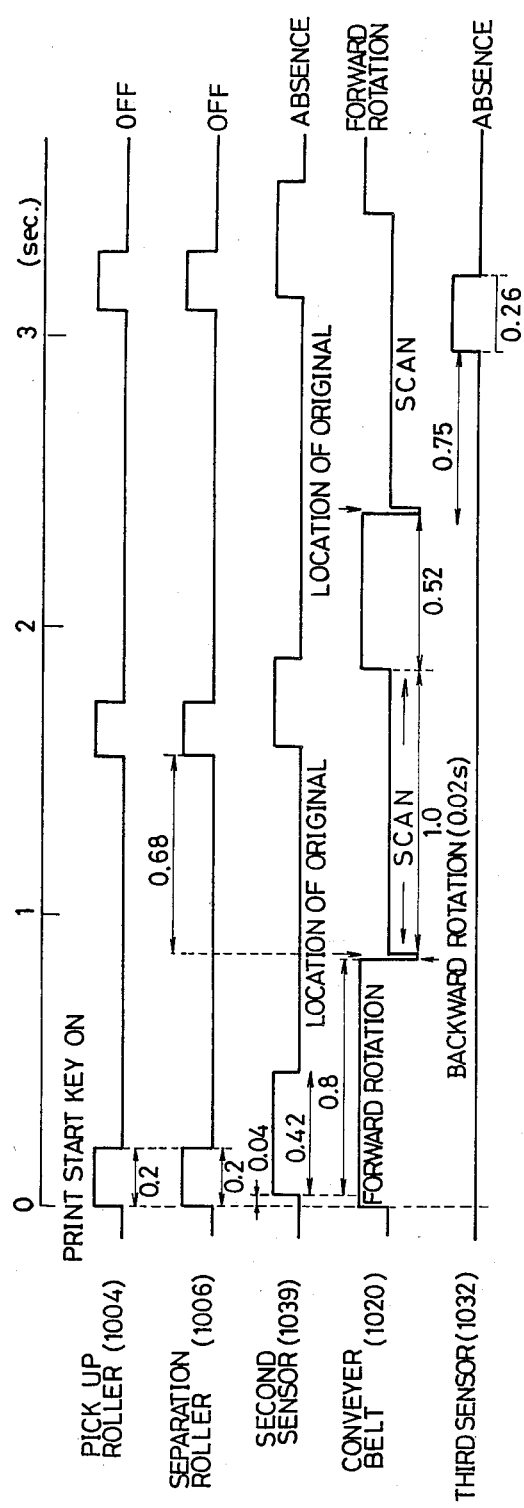
FIG. 6 is a timing chart for explaining the operation of the automatic document feeder shown in FIG. 1, in case that a plurality of single-sided image bearing originals are copied.

FIG. 6 is a timing chart for explaining the operation of the ADF 1000 in the case of making the copy from each of the single-sided image bearing originals. Referring to FIG. 6, when the print start key is made ON, the pick up roller 1004 and the separation roller 1006 as well as the conveyor belt 1020 are activated first, whereby the original feeding operation is started. Preferably, the feeding speed of the original in the original feeding station I as well as the feeding speed of the conveyor belt 1020 is 500 mm/sec, while the discharging speed of the original is 800 mm/sec. The length of the original fed out from the original table 1003 is detected by the second sensor 103, and then the original is fed to the conveyor belt 1020 which is rotated in the forward direction.

The feeding of the second original from the table 1003 is started at the end of 0.06 sec after the first original has passed through the second sensor 1039. Namely, the originals are successively fed out from the table 1003 with 50 mm intervals therebetween. In order to prevent offsetting of the originals, the separation roller 1006 and the pick up roller 1004 are stopped after being rotated for about 0.2 sec until the original arrives at the pull out rollers 1008 and 1009. The conveyor belt 1020 continues the forward rotation unit for 0.38 sec (190 mm) after the original has passed through the second sensor 1039, thereby conveying the original along the upper surface of the contact glass 101. After that, the conveyor belt 1020 is rotated in the backward direction for about 0.02 sec (about 10 mm) so as to abut the side edge of the original on the end portion of second change-over claw (i.e., the reference scale) 1018 and then stopped, whereby the original is located at the reference position. Then, the optical system 100 of the copying apparatus main body 10 is activated to effect scanning of the original. The source lamp 102 and the movable mirror 105 of the optical system 100 are linearly moved in unison at a speed of 250 mm/sec, and accordingly, in the case of a transversely postured A-4 size original, more than 0.88 sec is required for carrying out the scanning thereof. After the scanning of the first original has been completed, the first original is conveyed by means of the conveyor belt 1020 until the leading edge of the first original arrives at the discharge roller 1051.

On the other hand, the feeding of the second original from the table 1003 is started at the end of 0.68 sec after the first original has been located at the reference position, and then is on standby at a position about 50 mm before the second change-over claw (i.e., the reference scale) 1018 during the forward rotation of the conveyor belt 1020. Namely, before the second original is located at the reference position on the contact glass 101, the first original arrives at the discharge roller 1051. Accordingly, the first original can be conveyed toward the first tray 1052 by means of the discharge roller 1051 at a speed of 800 mm/sec, during the scanning of the second original, in the state independent from the rotation of the conveyor belt 1020 at the speed of 500 mm/sec.

Figure 7:
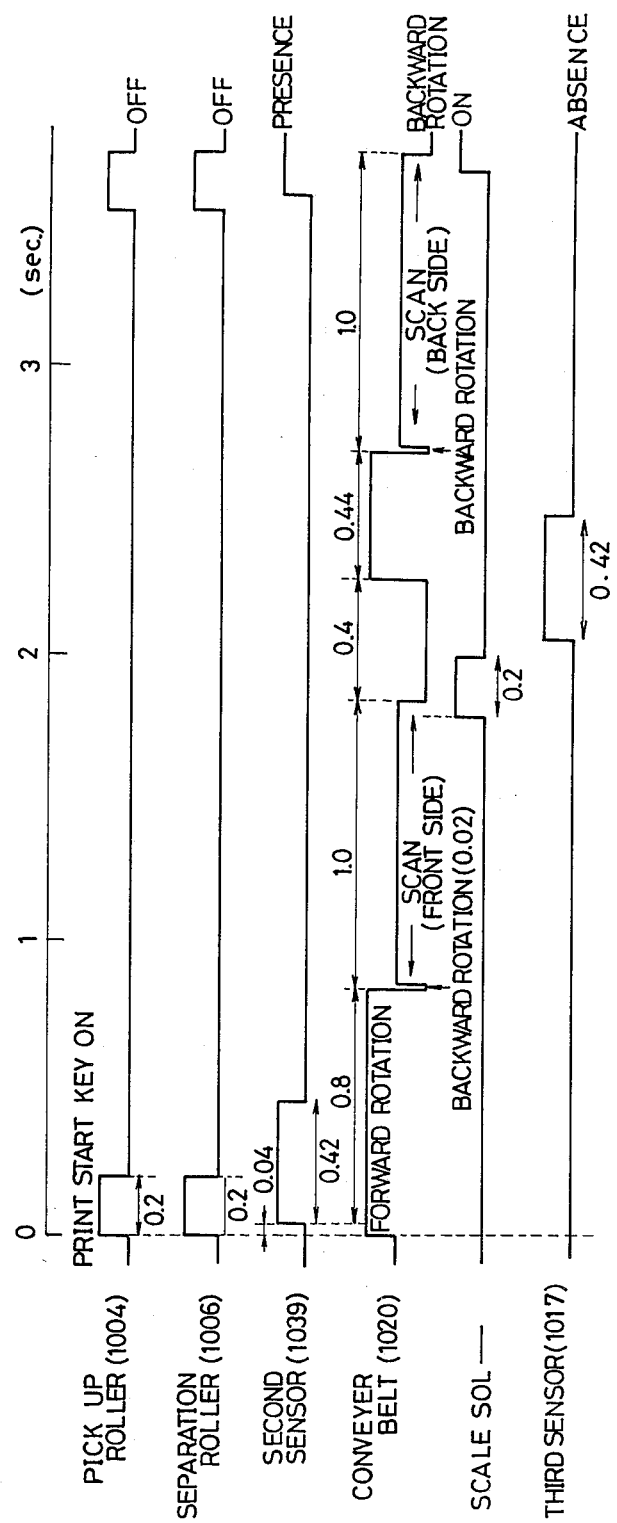
FIG. 7 is a timing chart for explaining the operation of the automatic document feeder shown in FIG. 1, in case that a plurality of double-sided image bearing originals are copied.

FIG. 7 is a timing chart for explaining the operation of the ADF 1000 in the case of making the copy from each of the double-sided image bearing originals. Referring to FIG. 7, the timing of feeding of the first double-sided original from the table 1003 to the reference position on the upper surface of the contact glass 101 is substantially the same as that of the single-sided original.

When scanning of the first page, i.e., the front side of the first original, has been completed, the conveyor belt 1020 is rotated in the backward direction, whereby the first original is conveyed from the upper surface of the contact glass 101 toward the reversing path Va of the common reversing unit V through the second change-over claw 1018 which is previously located at the second position 1018b. At this time, the first change-over claw 1015 is moved to a second position 1015b. Accordingly, the first original is returned through the first change-over claw 1015 to the upper surface of the contact glass 101 while being reversed upside down. On the other hand, the conveyor belt 1020 is changed into the forward rotation when the leading edge of the first original has arrived at the conveyor belt 1020. Namely, the conveyor belt 1020 is changed into the forward rotation at the end of 0.4 sec after the backward rotation of the conveyor belt 1020 has been started.

Then, the conveyor belt 1020 is rotated in the backward direction for 0.02 sec (10 mm), whereby the first original is located at the reference position with the side edge thereof abutted on the reference scale (i.e., the second change-over claw) 1018. In this state, the scanning of the second page, i.e., the back side of the first original is effected.

Before the scanning of the second page has been completed, the second change-over claw 1018 is moved to the second position 1918b. After the scanning of the second page has been completed, the conveyor belt 1020 is rotated in the backward direction, whereby the first original on the contact glass 101 is conveyed toward the reversing path Va of the common reversing unit V through the second change-over claw 1018. At this time, the first change-over claw 1015 is located at the first position, whereby the first original is further conveyed through the first change-over claw 1015 to the discharge path Na of the second discharging station IV while being reversed upside down. In this way, the first original is discharged through the discharge port 1035 to the second tray 1036.

The feeding of the second original from the table 1003 is started at the time 0.2 sec before the scanning of the second page has been completed, and the first original and the second original pass each other on the second change-over claw 1018, as the first original is conveyed from the upper surface of the contact glass 101 to the reversing path Va of the common reversing unit V. At this time, the second change-over claw 1018 is located at the first position 1018a, and the conveyor belt 1020 is changed into the forward rotation. Determining the minimum distance between the originals to 50 mm for the feeding of the single-sided originals makes it possible to obtain substantially the same CPM as that of the main body (the main body only: 40 CPM, ADF: 39 CPM).

In a conventional ADF, for example, the scanning operation of the optical system of the copying apparatus main body and the resisting of the transfer paper are started after the original has been located at the reference position, and the feeding of the second original is started after the first original has been discharged. In comparison to this, in the first embodiment of the present invention, particular operations are timely overlapped with each other, as described above, on the basis of the layout of the components of the ADF and the copying apparatus main body, resulting in the reduced operation time.

In the first embodiment, the ADF 1000 is controlled so that the original is not stopped at any curved portion of the original conveying path, it is possible to prevent occurrence of curved deformation of the original.

Further, in the first embodiment, the ADF 1000 can make it possible to reduce the residence time of the original in the conveying path thereof. As apparent from the timing chart shown in FIG. 6, when the operation of the ADF 1000 is stopped due to occurrence of a paper jam, only two originals at the most are held in the conveying path including the upper surface of the contact glass.

Figure 11:
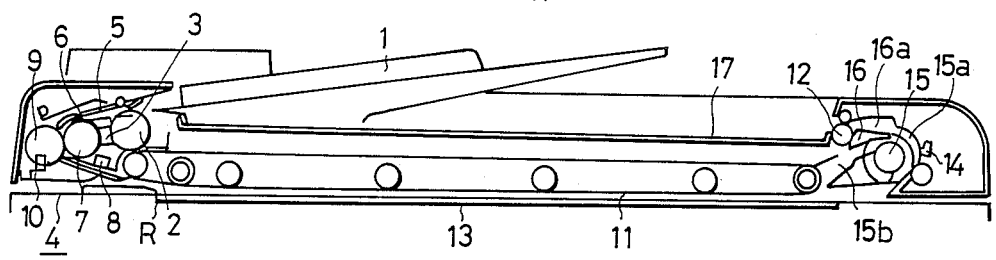
FIG. 11 is a schematic cross-sectional elevational view of a conventional automatic document feeder.

The operation of the ADF 1000 for the double-sided originals is considerably advantageous in comparison to the conventional ADF. An exemplary construction of the conventional ADF is illustrated in FIG. 11, in which reference numeral 1 designates an original table, 2 a pick up roller, 3 a sensor for detecting presence of an original in the table 1, and 4 a copying apparatus main body; 5 designates a pick up roller, 6 a separation belt, 7 a separation roller, 8 a sensor for detecting registration of the original and for detecting the width of the original, 9 a pulse generator, and 10 a sensor for detecting the length of the original; 11 designates a conveyor belt, 12 an original discharge roller, 13 a contact glass of the main body, 14 a sensor for detecting the original to be reversed upside down, 15 a reversing roller, 16 a pivotable change-over claw, and 17 an original receiving tray.

In the conventional ADF, a plurality of originals are stacked on the original table 1 in the state that the image bearing surface of each of the original is oriented upward. Many originals are fed out from the table 1 to a passage between the separation belt 6 and the separation roller 7 by means of the pick up roller 2 and the pick up lever 5. The separation belt 6 and a separation roller 7 are constructed to feed only the lowermost original having the last page from the table 1 to the upper surface of the contact glass 13. The original is reversed upside down while being conveyed between the table 1 and the contact glass 13.

When the trailing edge of the original has passed through the sensor 8, the sensor 8 is made OFF, whereby the original is stopped at a reference position R.

When scanning and copying operations of the copying apparatus main body 4 have been completed, the conveyor belt 11 is operated on the basis of an output signal of a control unit (not shown) in the main body 4, whereby the original on the contact glass 13 is discharged through the discharge roller 12 to the tray 17, and the next original is fed to the upper surface of the contact glass 13.

On the other hand, when the conventional ADF is operated for making copies from each of double-sided originals, the original fed from the table thereof is passed through the contact glass 13 toward the reversing roller 15, and thus the leading edge of the original is detected by the sensor 14. The change-over claw 16 is pivotally movable between a first position, at which the claw 16 connects the reversing path 15a to the discharge path 12a, and a second path at which the claw 16 connects the reversing path 15a to the return path 15b. When the original is detected first by the sensor 14, the claw 16 is moved from the second position, and accordingly, the original is conveyed from the reversing path 15a to the upper surface of the contact glass 3 thorough the return path 15b.

Figure 12A:
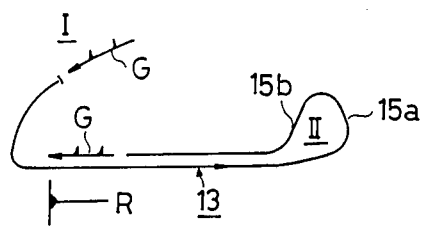
FIGS. 12(a) to 12(c) are views for explaining respective stages of conveyance of the original in the automatic document feeder shown in FIG. 11.
Figure 12B:
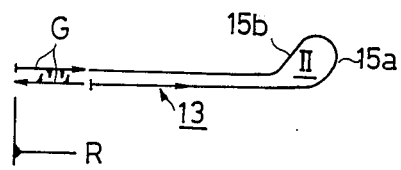
Figure 12C:
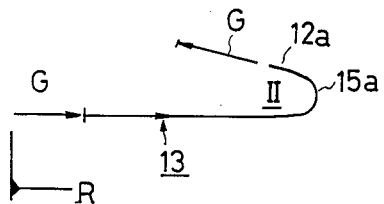

FIG. 12(a) to 12(c) schematically illustrate the operation of the conventional ADF shown in FIG. 11, respectively, in which reference character G designates an original, I designates an original feeding station including the table 1 and the pick up roller 2 etc., and II designates an original reversing station including the reversing path 15a, the return path 15b and the discharge path 12a.

Referring to FIG. 12(a) to 12(c), when the conventional ADF is operated for making copies from each of the double-sided originals, the back side of the original on the station II has to be copied first. Namely, as shown in FIG. 12(a), the original G fed from the station I is passed through the upper surface of the contact glass 13 to the reversing station H and then returned from the reversing station H to the reference position R on the upper surface of the contact glass 13 while being reversed upside down. At this stage, the back side of the original G is scanned.

Then, as shown in FIG. 12 (b), the original G on the upper surface of the contact glass 13 is conveyed to the reversing station II and then returned to the reference position R on the upper surface of the contact glass 13 again while being reversed upside down. At this stage, the front side of the original G is scanned.

Then, as shown in FIG. 12 (c), the original G on the upper surface of the contact glass 13 is discharged through the reversing station II toward the tray.

Accordingly, in the above-mentioned conventional ADF, it is necessary to reverse twice the double-sided original in order to scan opposite sides thereof. As the result, an overall length of movement of the original along the conveying path is considerably increased. It has been proved that in the conventional ADF of a standard size, an overall length of movement of the original along the conveying path is 2632.5 mm.

In comparison to this, in the above-described ADF 1000 of a standard size, according to the present invention, an overall length of movement of the original along the conveying path is about 1200 mm only, resulting in reduced scanning time or copying time.

Figure 8A:
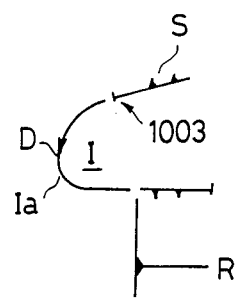
FIGS. 8(a) to 8(c) are views for explaining respective stages of conveyance of the original in the automatic document feeder shown in FIGS. 4 and 5, respectively.
Figure 8B:
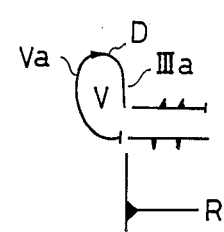
Figure 8C:
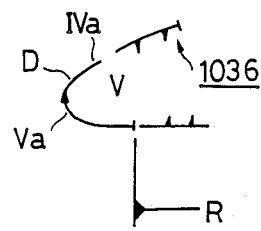

FIG. 8(a) to 8(c) schematically illustrate the operation of a main part of the ADF of the first embodiment, respectively, in which the front surface of the original D is designated by S.

As shown in FIG. 8(a), in the process for copying the front side S of the original D, the original D fed from the table 1003 through the original feeding station I is rapidly located at the reference position R. Further, as shown in FIG. 8(a), in the process for copying the back side of the original D, the original D removed from the reference position R is rapidly led to the common reversing unit V and then rapidly returned to the reference position R. Furthermore, as shown in FIG. 8(c), in the process for discharging the original D, the original D removed from the reference position R is rapidly led through the common reversing unit V and then rapidly discharged to the second tray 1036. In this way, in the illustrated ADF 1000, since it is not necessary to convey the original to-and-fro between the opposite ends of the ADF 1000, it is possible to eliminate useless conveying time of the original.

In the ADF 1000 of the first embodiment, the single-sided original can be scanned in order of page. If the original circulating station II of the ADF 1000 is so constructed as to discharge the single-sided originals from the upper surface of the contact glass 101 to the second tray 1038, it will be necessary to provide a complicated conveying path in the original circulating station II, in order to stack the single-sided originals on the second tray 1036 in order of page. However, in the ADF 1000 of the first embodiment, it is possible to discharge the single-sided originals from the upper surface of the contact glass 101 to the first tray 1052 through a short linear path, due to effective arrangement of the first tray 1052 and the original circulating station II. As the result, the single-sided originals can be stacked on the tray in order of page with the simple construction of the original circulating station II, and thus the probability of occurrence of a paper jam in the original circulating station II is reduced.

Further, in the first embodiment, the originals are fed out from the original table 1003 in order of page and also in order from the uppermost original. Accordingly, when a paper jam of the original has occurred, it is only necessary to reset the jammed original on the remaining original on the table 1003, resulting in an easy resetting operation.

Figure 9:
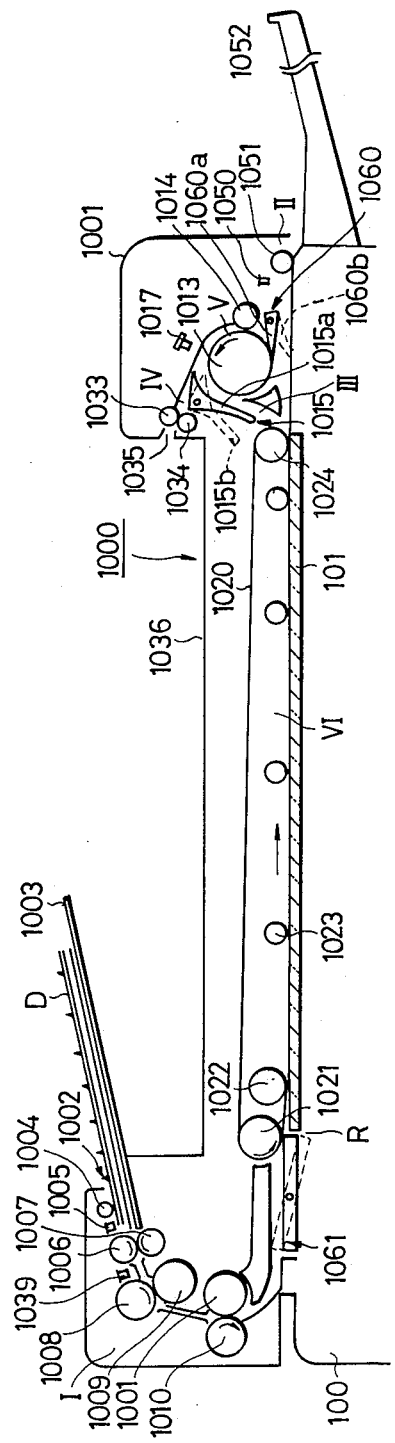
FIG. 9 is a schematic cross-sectional elevational view of an automatic document feeder according to a second embodiment of the present invention.

FIG. 9 illustrates a second embodiment of an automatic document feeder according to the present invention, and those parts which correspond with the parts in the first embodiment shown in FIGS. 1, 4, and 5 are provided with the same reference numerals as in FIGS. 1, 4, and 5.

In the second embodiment, the original circulating station III and second discharging station IV as well as the common reversing unit V are provided in the vicinity of the first tray 1052. The function of the first change-over claw 1015 in the second embodiment is substantially the same as that of the first change-over claw 1015 in the first embodiment. In the second embodiment, the second change-over claw 1060 is provided for selectively connecting the upper surface of the contact glass 101 to the conveying path of the first discharging station II or the reversing path of the common reversing unit V. Further, in the second embodiment, the original feeding station I is provided with a reference scale 1081, which is capable of abutting on one side edge of the original, for locating the original at a predetermined reference position.

In the second embodiment, the operation of the ADF 1000 for the single-sided originals is substantially the same as that of the first embodiment. In the operation of the ADF 1000 for the double-sided originals, although an overall length of movement of the original along the conveying path is increased, the double-sided originals can be scanned in order of page and also in order from the uppermost original, then, and can be stacked on the second tray 1036 in order of page, as like as the first embodiment.

Figure 10:
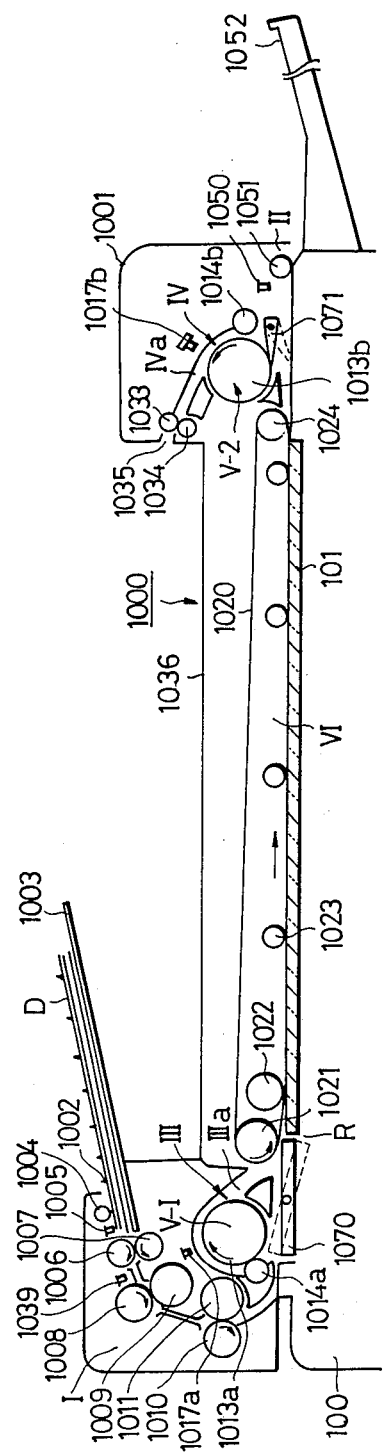
FIG. 10 is a schematic cross-sectional elevational view of an automatic document feeder according to a third embodiment of the present invention.

FIG. 10 illustrates a third embodiment of an automatic document feeder according to the present invention, and those parts which correspond with the parts in the first embodiment shown in FIGS. 1, 4, and 5 are provided with the same reference numerals as in FIGS. 1, 4, and 5.

In the third embodiment, the original circulating station III comprises a first reversing unit V-1, which is comprised of rollers 1013a and 1014a, for reversing the original upside down while conveying the original. The original circulating station III further comprises a return path IIIa for conveying the original from the first reversing unit V-1 to the upper surface of the contact glass 101. The first reversing unit V-1 is provided with a first change-over claw 1070. The function of the first change-over claw 1070 is substantially the same as that of the second changeover claw 1018 of the first embodiment.

In the third embodiment, the second discharging station IV comprises a second reversing unit V-2, which is comprised of rollers 1013b and 1014b, for reversing the original upside down while conveying the original. The second discharging station IV further comprises a discharge path Na for conveying the original from the second reversing unit V-2 to the second tray 1036. The second reversing unit V-2 is provided with a second change-over claw 1071. The function of the second change-over claw 1071 is substantially the same as that of the second changeover claw 1060 of the second embodiment. Sensors 1017a and 1017b are provided in the original circulating station III and the second discharging station IV, respectively, for detecting the original.

In the third embodiment, the operation of the ADF 1000 for the single-sided originals is substantially the same as that of the first and second embodiments. In the operation of the ADF 1000 for the double-sided originals, although an overall length of movement of the original along the conveying path is increased, as like as the second embodiment, the double-sided originals can be scanned in order of page and in order from the uppermost original. Further, the double-sided originals can be stacked on the second tray 1036 in order of page, as like as the first and second embodiments.

While the invention has been described in conjunction with specific embodiments thereof, it is evident that many alternatives, modifications, and variations will be apparent to those skilled in the art in light of the foregoing description. Accordingly, it is intended to include all such alternatives, modifications and variations as fall within the spirit and scope of the appended claims.

What is claimed is:

1. An automatic document feeder for use in combination with an optical scanning device which is selectively operative in a first scanning mode for scanning only a single side of an original and in a second scanning mode for scanning double sides of an original, said automatic document feeder comprising:

(a) an original table for stacking thereon a plurality of originals to be scanned, in sequence of scanning, in such a manner that a first page of the original to be first scanned is faced uppermost;
(b) a first conveying means for conveying the original stacked on said original table to an optical scanning station at which the originals are optically scanned, in order from the uppermost original, said first conveying means reversing each of the originals upside down while conveying each of the originals;
(c) a first original receiving tray for receiving the originals scanned in said first scanning mode;
(d) a second original receiving tray for receiving the originals scanned in said second scanning mode;
(e) a reversing and conveying means disposed in the vicinity of said optical scanning station and in the vicinity of said second original receiving tray for reversing the originals conveyed thereto in said second scanning mode upside down and for selectively conveying the reversed originals, double sides of which are scanned, to said second original receiving tray or the reversed originals, one sides of which are scanned and the other sides of which are to be scanned, to said optical scanning station; and
(f) a second conveying means disposed on said optical scanning station for selectively conveying, without reversing the originals upside down, the originals scanned in said first scanning mode from said optical scanning station to said first original receiving tray or the originals scanned in said second scanning mode from said optical scanning station to said reversing and conveying means.

2. An automatic document feeder according to claim 1 in which said reversing and conveying means comprises:

(a) a reversing unit for reversing the originals conveyed thereto upside down and
(b) a first change-over means disposed in the vicinity of said reversing unit and in the vicinity of said second original receiving tray for selectively conveying the reversed originals in association with said reversing unit.

3. An automatic document feeder according to claim 2 in which said first change-over means comprises a swingable claw member.

4. An automatic document feeder according to claim 3 in which said second conveying means comprises a conveyor unit conveyable along said optical scanning station in one direction toward said first original receiving tray and in the other direction toward said reversing and conveying means.

5. An automatic document feeder according to claim 2 in which said reversing unit further comprises a second change-over means for selectively connecting said optical scanning station to said first conveying means or to said reversing unit.

6. An automatic document feeder according to claim 5 in which said second change-over means is adapted to abut on one side edge of the original for positioning the original at a predetermined position on said optical scanning station.

7. An automatic document feeder according to claim 6 in which said second conveying means comprises a conveyor unit conveyable along said optical scanning station in one direction toward said first original receiving tray and in the other direction toward said reversing and conveying means.

8. An automatic document feeder according to claim 5 in which said second conveying means comprises a conveyor unit conveyable along said optical scanning station in one direction toward said first original receiving tray and in the other direction toward said reversing and conveying means.

9. An automatic document feeder according to claim 2 in which said second conveying means comprises a conveyor unit conveyable along said optical scanning station in one direction toward said first original receiving tray and in the other direction toward said reversing and conveying means.

10. An automatic document feeder according to claim 1 in which said second conveying means comprises a conveyor unit conveyable along said optical scanning station in one direction toward said first original receiving tray and in the other direction toward said reversing and conveying means.

* * * * *